United States Patent [19]
Boccadoro

[11] Patent Number: 5,410,118
[45] Date of Patent: Apr. 25, 1995

[54] METHOD AND DEVICE FOR CONTROLLING A SPARK EROSION MACHINE

[75] Inventor: Marco Boccadoro, Verscio, Switzerland

[73] Assignee: A.G. für industrielle Elektronik, Losone, Switzerland

[21] Appl. No.: 997,259

[22] Filed: Dec. 24, 1992

[30] Foreign Application Priority Data

Dec. 23, 1991 [CH] Switzerland ............... 03833/91

[51] Int. Cl.⁶ .................................. B23H 7/20
[52] U.S. Cl. ........................ 219/69.13; 219/69.16; 219/69.17
[58] Field of Search .............. 219/69.13, 69.16, 69.17; 364/474.04

[56] References Cited

U.S. PATENT DOCUMENTS

| | | | |
|---|---|---|---|
| 3,705,286 | 12/1972 | Kondo et al. | 219/69.13 |
| 3,729,610 | 4/1973 | Kondo | 219/69.13 |
| 3,739,137 | 6/1973 | Marendaz | 219/69.13 |
| 3,825,714 | 7/1974 | Marendaz | 219/69.16 |
| 3,912,898 | 10/1975 | Pfau et al. | 219/69.17 |
| 3,975,607 | 8/1976 | Ullmann et al. | 219/69.13 |
| 5,117,083 | 5/1992 | Kawamura | 219/69.16 |
| 5,200,905 | 4/1993 | Uemoto et al. | 219/69.13 |
| 5,216,218 | 6/1993 | Sasaki | 219/69.16 |
| 5,267,141 | 11/1993 | Morita et al. | 219/69.13 |

Primary Examiner—Geoffrey S. Evans
Attorney, Agent, or Firm—C. Hildebrand; Egli International

[57] ABSTRACT

At least two parameters ($\delta$, Inst) of which it is known that their variation influences the state of the spark erosion process (F, W) are fed to a logic device (5) in which a set of rules is stored. The logic device processes the parameters fed with the aid of the stored rules according to the laws of fuzzy logic, and generates at least one output signal ($\epsilon$) which is fed to a controller (6) of at least one parameter, in order to match or at least approximate the currently prevailing state of the spark erosion process to a currently desired state of the spark erosion process.

22 Claims, 3 Drawing Sheets

METHOD AND DEVICE FOR CONTROLLING A SPARK EROSION MACHINE

BACKGROUND OF THE INVENTION

The invention relates to a method and a device for controlling a spark erosion process in a spark erosion machine having a spark erosion electrode and a workpiece, at least two parameters whose variation is known to influence a currently prevailing state of the spark erosion process being fed individually or as a combination thereof to a logic device in order to generate at least one output signal of this logic device which is fed to a controller for at least one of the said parameters, the parameters fed to the logic device being processed therein with the aid of rules stored therein according to the laws of fuzzy logic.

A method and a device of this type are disclosed in EP-0426870. The logic device of the relevant device receives two input values (Si and δSi) of which each is a parameter of the currently prevailing state of the spark erosion process, or corresponds thereto, and it supplies two output values (δT and δD). The rules stored in the logic device determine how these two output values (δT and δd) are to be varied when the input values (Si and δSi) vary individually or together, and the two output values (δT and δD) are then processed in a controller to form input parameters (T and D) of the spark erosion process.

It is disadvantageous in this method and the corresponding device that the input values cannot be varied as a function of one another or that one of these input values cannot be varied as a function of the other.

A method and a device of the type mentioned at the beginning are also the subject matter of European Patent Application No. 91112510.2 which, although filed before the priority date of the present patent application, was not published as publication EP-0469471 until after the priority date of the present patent application. Three input values (A, B and C) are processed in the logic device of the device according to EP-0469471, which are defined as temporally sequential values or temporally different mean values of always the same parameter of the spark erosion process (electrode position), which means that it is always values of a single parameter prevailing at different times which are compared. One of these values of the parameter can be situated in the present, but the other values are necessarily situated in the past and cannot be "retroactively" varied. Accordingly, the device of EP-0469471 has a value memory, and it cannot operate in real time with regard to all the parameters of the spark erosion process. For this reason, the rules stored in the logic device cannot determine how one of the parameters fed is to be varied when another of the parameters fed varies.

It is thus also disadvantageous in this method and the corresponding device that the input values cannot be varied as a function of one another or that one of these input values cannot be varied as a function of the other.

A method and a device for controlling a spark erosion process in a spark erosion machine having a spark erosion electrode and a workpiece, and in particular a method and a device for controlling the position of the spark erosion electrode with reference to the workpiece in a spark erosion machine are disclosed in EP-A-0333170 or U.S. Pat. No. 4864091. The actual distance between the spark erosion electrode and the workpiece is compared to a desired distance, which corresponds to the currently desired process conditions for machining the workpiece. An error signal is formed from the comparison, which is directed via low-pass filter circuit to a control circuit for moving the spark erosion electrode.

A method and a device for controlling a spark erosion process in a spark erosion machine having a spark erosion electrode and a workpiece, and in particular a method and a device for controlling the position of the spark erosion electrode with reference to the workpiece in a spark erosion machine are also disclosed in EP-A-272640 or U.S. Pat. No. 4822970. The actual distance between the spark erosion electrode and the workpiece is regularly varied by means of raising and lowering movements, and these raising and lowering movements are controlled as a function of the currently prevailing and previously found process conditions for machining the workpiece.

It is disadvantageous in these methods and devices that the influence of other parameters of the machining of the workpiece is not included in the control of the movement of the spark erosion electrode.

The above-mentioned method and the above-mentioned device according to EP-A-0333170 or U.S. Pat. No. 4864091 do permit the control response of the servo-system for controlling the actual distance between the spark erosion electrode and the workpiece to be optimized for most process conditions by matching the cut-off frequency of the low-pass filter circuit to these process conditions and keeping the AC component of the error signal at a minimum. The error signal is then input into a PID controller in order to achieve the desired dynamic response of the servo-system. The output signal of the PID controller is fed to a drive of the spark erosion electrode in order to move the latter. Since, however, it is not known to model the spark erosion process in the sense of automatic control engineering, it is necessary when designing the PID controller to proceed empirically (by trial and error), which is very complicated and does not lead reliably to an optimum result.

The above-mentioned empirical approach does not suffice for very difficult spark erosion processes, for example in the case of very large machines or, by contrast, in the process of micro-erosion. Specifically, such cases give rise to a problem of instability which is caused by the time constant of the machine being unusually large or small. The influence of many parameters then bears so strongly on the stability of the spark erosion process that account has to be taken of these parameters.

However, no technical solution which can be advocated in practice exists for feeding the known controllers with even more numerous parameters of the machining of the workpiece and even more information relating to the currently prevailing and previously found process conditions. The complexity of the spark erosion process is of such a type that it is not possible to set up or implement with a justifiable outlay any algorithm for processing all the parameters known as relevant for the spark erosion process. It has always been necessary to put up with compromise solutions in the prior art.

SUMMARY OF THE INVENTION

It is therefore the object of the invention to propose a method and a device of the type mentioned at the beginning and in which the controllers determining the spark erosion process such as, for example, the controller of the position of the spark erosion electrode with reference to the workpiece, the controller of the flushing in the region of the working clearance and the controller for feeding electrical energy to the spark gap take account with a justifiable outlay of all the parameters regarded as relevant and whose mutual interactions are known to the person skilled in the art, with the spark erosion process being controlled in real time with respect to all its parameters.

In order to achieve this object, a method of the type mentioned at the beginning is characterized according to the invention in that said at least two parameters correspond essentially to one and the same currently prevailing state of the spark erosion process, the rules stored in the logic device determine how one of the parameters fed is to be varied when another of the parameters fed varies, and the controller varies the parameter to be varied in such a way that the currently prevailing state of the spark erosion process is matched or at least approximated to a currently desired state of the spark erosion process.

The invention renders it possible to generate a single output value in the logic device from at least two input values which correspond to one and the same currently prevailing state of the spark erosion process, and to use it to control one parameter fed to said logic device as a function of the other.

Preferably, the logic device is fed at least a first parameter which corresponds to a difference, smoothed if appropriate in a low-pass filter circuit, between an actual value and a desired value of an ignition delay of a spark ignition in the region of a spark gap of the spark erosion machine.

The logic device is preferably fed at least a second parameter which corresponds to an instability in the spark erosion process.

This instability is expressed by short-term fluctuations in one or more operating parameters of the spark erosion process. By contrast, the operating parameters of the spark erosion process are normally measured as mean values over measurement times of the order of magnitude of a minute or more. Short-term variations are therefore to be understood as those which allow an operating parameter of the spark erosion process to deviate from the mean value without essentially varying this mean value. For example, the normally determined feed of the spark erosion electrode is to be understood as the mean value of the range of variation in the position of the spark erosion electrode with reference to the workpiece, and the normally determined feed rate of the spark erosion electrode is to be understood as the mean value of the rate of variation in the position of the spark erosion electrode with reference to the workpiece.

Under these preconditions, the second parameter can correspond to a short-term range of variation or a short-term rate of variation in the position of the spark erosion electrode with reference to the workpiece, or in addition to a combination thereof, to a short-term range of variation or to a short-term rate of variation in the ignition delay, or in addition to a combination thereof, or to a short-term range of variation or to a short-term rate of variation in the output signal of the logic device, or in addition to the combination thereof, for example can be a function thereof and, in particular, equal or proportional thereto.

In this case, the parameter controlled by the output signal of the logic device can preferably correspond to the position of the spark erosion electrode with reference to the workpiece in the spark erosion machine.

The method according to the invention is preferably designed such that the logic device processes the first and the second parameters with the aid of the following rules:

| | | | | | |
|---|---|---|---|---|---|
| If $\delta$ in NS | then | $\epsilon$ in NS | | | |
| If $\delta$ in ZO | then | $\epsilon$ in ZO | | | |
| If $\delta$ in PS | then | $\epsilon$ in PS | | | |
| If $\delta$ in NM | and | Inst in B | then | $\epsilon$ in NS | |
| If $\delta$ in NM | and | Inst in M | then | $\epsilon$ in NM | |
| If $\delta$ in NM | and | Inst in S | then | $\epsilon$ in NM | |
| If $\delta$ in NB | and | Inst in B | then | $\epsilon$ in NM | |
| If $\delta$ in NB | and | Inst in M | then | $\epsilon$ in NB | |
| If $\delta$ in NB | and | Inst in S | then | $\epsilon$ in NB | |
| If $\delta$ in PM | and | Inst in B | then | $\epsilon$ in PS | |
| If $\delta$ in PM | and | Inst in M | then | $\epsilon$ in PS | |
| If $\delta$ in PM | and | Inst in S | then | $\epsilon$ in PM | |
| If $\delta$ in PB | and | Inst in B | then | $\epsilon$ in PS | |
| If $\delta$ in PB | and | Inst in M | then | $\epsilon$ in PM | |
| If $\delta$ in PB | and | Inst in S | then | $\epsilon$ in PB | | according to the laws of fuzzy logic, in order to generate the output signal $\epsilon$ of the logic device, $\delta$ denoting the first parameter, Inst denoting the second parameter, and $\epsilon$ denoting the output signal of the logic device, and use being made of the following definitions for the ranges of the values of the parameters $\delta$ and Inst and of the output signal $\epsilon$

| | | | |
|---|---|---|---|
| NB | negative big | B | big |
| NM | negative medium | M | medium |
| NS | negative small | S | small |
| ZO | approximately zero | | |
| PB | positive big | | |
| PM | positive medium | | |
| PS | positive small. | | |

It is preferred in this case that at least two adjacent ranges of values of the output signal $\epsilon$ are situated between respective limiting values of which two adjacent limiting values can be varied in pairs with the aim of optimizing the method.

In this case, it is preferably possible that the limiting values are varied in pairs by an amount predetermined in each case, after stabilization of a resulting new state of the spark erosion process a corresponding rate of variation in the position of the spark erosion electrode with reference to the workpiece is determined (feed rate of the spark erosion electrode), the variation of the limiting values is carried out a plurality of times, the resulting rates of variation (feed rates) are intercompared, and an optimized method is continued using those optimized limiting values by means of which the largest resulting rate of variation (feed rate) was achieved.

Such a method can preferably be recursively repeated using the optimized limiting values.

A device according to the invention for carrying out the method according to the invention comprises a spark erosion electrode, a workpiece, and a logic device having at least two inputs for parameters to be input and at least one output for an output signal which is fed to a controller for at least one parameter, the logic device being constructed to store a set of rules for processing the parameters fed to it according to the laws of fuzzy logic.

The invention renders it possible to include the influence of many parameters of the machining of the workpiece in controlling the movement of the spark erosion electrode.

In particular, a significant stabilization of the spark erosion process is achieved by means of the design of the invention, in which the first parameter corresponds to a difference, or smoothed difference between the actual value and the desired value of the ignition delay, the second parameter corresponds to an instability in the spark erosion process, and the controlled parameter corresponds to the working clearance or the spark gap. In addition and as a consequence thereof, both the wear of the spark erosion electrode as well as the erosion of the workpiece and the roughness of the surfaces of the workpiece that have been machined thereby are improved, that is to say the wear and the roughness are diminished and the erosion is increased.

BRIEF DESCRIPTION OF THE DRAWINGS

The invention is explained in more detail below with the aid of the drawing, wherein.

DETAILED DESCRIPTION OF THE PREFERRED EMBODIMENTS

Figure 1:
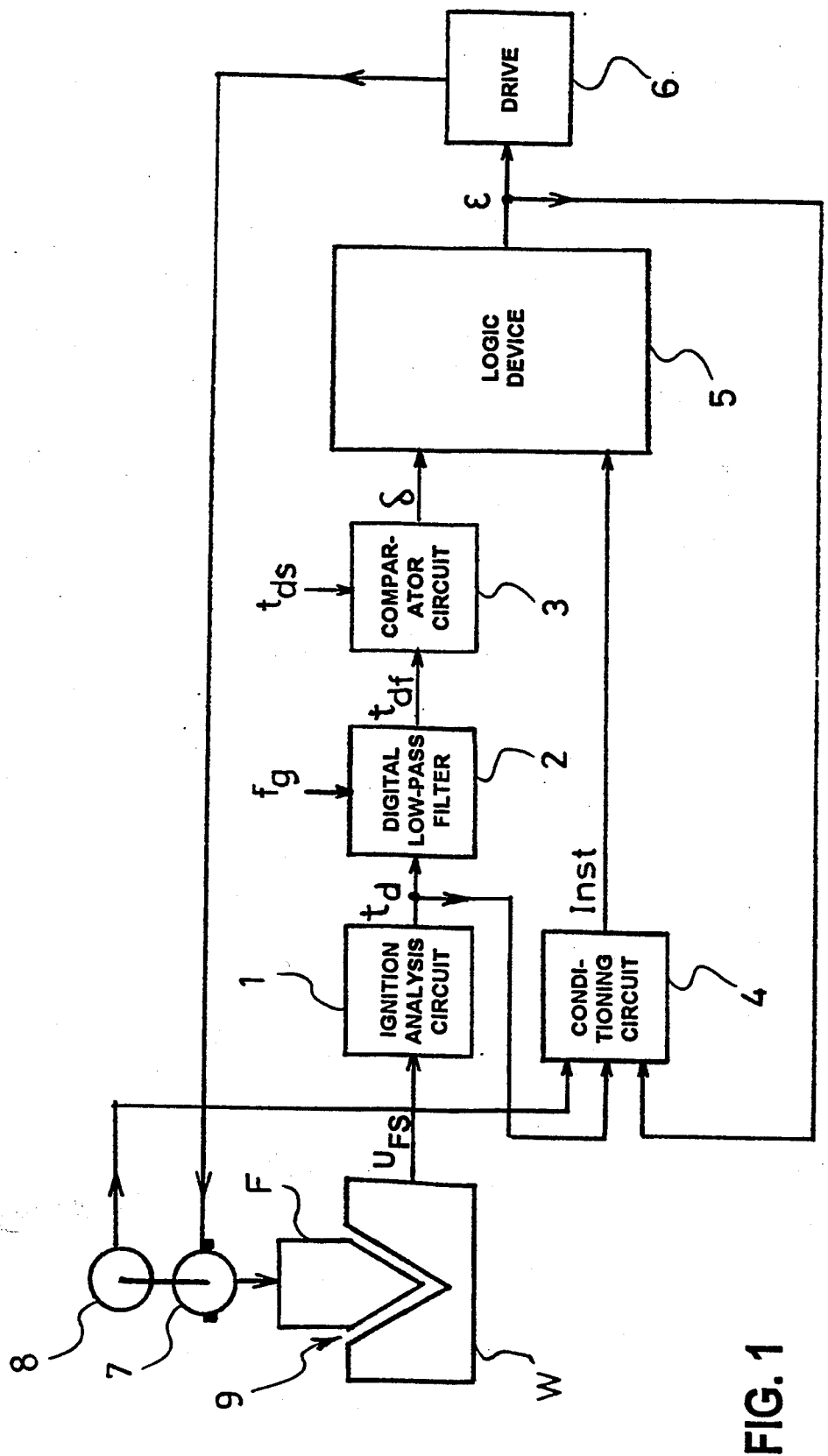
FIG. 1 shows a block diagram of a device according to the invention connected to a spark erosion electrode and a workpiece in a spark erosion machine.

A spark erosion electrode F and a workpiece W of a spark erosion machine are represented diagrammatically in FIG. 1. The spark erosion electrode F is represented in the present description as a sink electrode, but this is not to be understood as a limitation. A working clearance or spark gap 9 is situated between the spark erosion electrode F and the workpiece W. The spark gap voltage or voltage at the working clearance $U_{FS}$ is measured at this spark gap 9 in a known way, which is therefore not represented.

Likewise in a way which is known and therefore not represented, the spark gap voltage $U_{FS}$ is compared in an ignition analysis circuit 1 with a desired value of the spark gap voltage, in order to produce a digital actual value $t_d$ of the ignition delay.

The actual value $t_d$ of the ignition delay is directed via a digital low-pass filter 2 with an adjustable cut-off frequency $f_g$ and processed therein to form a smoothed actual value $t_{df}$ of the ignition delay. The cut-off frequency $f_g$ of the low-pass filter 2 is adjusted as a function $f_g(T, P, I)$ of the pulse duration T, the interpulse duration P and the current amplitude I. Such a digital low-pass filter and its use are disclosed, for example, in EP-A-0333170 or U.S. Pat. No. 4,864,091, already mentioned above.

The smoothed actual value $t_{df}$ of the ignition delay is compared in a comparator circuit 3 with a desired value $t_{ds}$, in order to produce a digital value $\delta$ of the smoothed difference between the actual value and the desired value of the ignition delay.

This digital value $\delta$ of the smoothed ignition delay difference is input as first input parameter into the logic device 5 for processing values according to the laws of fuzzy logic (fuzzy logic circuit). Such a logic device is known per se and commercially available; the FC110 DFP (Digital Fuzzy Processor) from Togai InfraLogic Inc. in Irvine (Calif., USA) may be mentioned here as an example.

A parameter which corresponds to an instability in the spark erosion process, possibly after its digitization for further use in the fuzzy logic circuit 5, is conditioned in a conditioning circuit 4. This instability in the spark erosion process is represented in the present description as an absolute value, that is to say always as a positive value, but this is not to be understood as a limitation.

A possible parameter which corresponds to an instability in the spark erosion process is the short-term range of variation, or the short-term rate of variation in the position of the spark erosion electrode with reference to the workpiece or in addition a combination thereof, in other words the short-term range of variation or the short-term rate of variation in the width of the working clearance or the spark gap 9 or in addition a variable dependent thereon.

The width of the working clearance or the spark gap 9, or the variable dependent thereon is normally measured as mean values over measurement times of the order of magnitude of a minute or more. By contrast, variations to be understood as short term are those which permit the width of the working clearance or the spark gap 9 or the variable dependent thereon to deviate from the mean value without substantially varying this mean value.

The spark erosion electrode F is moved by a motor 7, and its movement is measured by a sensor 8. The sensor 8 is represented in the present description as a coder on the shaft of the motor 7, but this is not to be understood as a limitation. The signal from the sensor 8 is fed to the conditioning circuit 4, in order to be conditioned there to form a digital signal "Inst" corresponding to the instability of the spark erosion process. For this purpose, the signal is directed from the sensor 8 in the conditioning circuit 4, for example via a high-pass filter and thereafter via a low-pass filter.

The motor 7 is controlled by a drive 6 which receives as input variable an output signal $\epsilon$ of the logic device 5 or a variable proportional thereto.

Another possible parameter which corresponds to an instability in the spark erosion process is the short-term range of variation or the short-term rate of variation of the output signal $\epsilon$ of the logic device 5 or in addition a variable dependent thereon. This output signal $\epsilon$ is also fed from the output of the logic device 5 to the conditioning circuit 4, in order to be conditioned therein to form a digital signal "Inst" corresponding to the instability of the spark erosion process.

A further possible parameter which corresponds to an instability in the spark erosion process is the short-term range of variation or the short-term rate of variation in the actual value $t_d$ of the ignition delay or in addition a variable dependent thereon. This actual value $t_d$ is also fed from the output of the ignition analysis circuit 1 to the conditioning circuit 4, in order to be conditioned therein to form a digital signal "Inst" corresponding to the instability in the spark erosion process.

It is to be understood that the three previously mentioned parameters corresponding to the instability in the spark erosion process can be conditioned individually or in an arbitrarily desired, for example linear, combination thereof in the conditioning circuit 4 to form a digital signal "Inst" corresponding to the instability of the spark erosion process. This "Inst" signal is, as already mentioned, an absolute value in the design specified here as an example, that is to say is always a positive value, but this is not to be understood as a limitation, that is to say designs are also possible having an "Inst" signal with a sign.

It is likewise to be understood that the three previously mentioned parameters corresponding to the instability in the spark erosion process are not the only parameters which can be used for this purpose. Among other parameters which can be used may be cited: (i) in relation to the number of pulses per time unit in the spark gap, the number of short-circuits, in other words the relative number of pulses which do not reach a predetermined first voltage threshold; (ii) in relation to the number of pulses per time unit in the spark gap, the number of discharges without deionization in the spark gap, in other words the relative number of pulses which do not reach a predetermined second voltage threshold, the second predetermined voltage threshold being higher than the first predetermined voltage threshold; (iii) in relation to the number of pulses per time unit in the spark gap, the number of arcs, in other words the relative number of pulses which do not have a predetermined shape and nor therefore a predetermined time characteristic; (iv) and more such.

The formation of the sets to be processed in the logic device 5 according to the laws of fuzzy logic will now be explained in more detail. First step is to subdivide the positive and/or negative values into the ranges of "big", "medium" and "small", as well as "zero". If, in addition, P is put for positive, N for negative, B for big, M for medium, S for small, and ZO for zero, the following defined ranges are produced:

| NB | negative big | B | big |
| NM | negative medium | M | medium |
| NS | negative small | S | small |
| ZO | approximately zero | | |
| PB | positive big | | |
| PM | positive medium | | |
| PS | positive small. | | |

Figure 2:
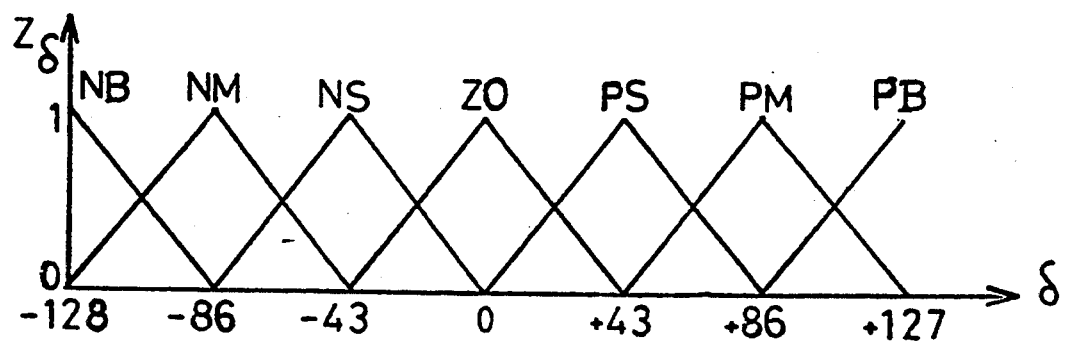
FIG. 2 shows a diagram of the degree of membership of a value of the ignition delay relative to a fuzzy set of possible values of the ignition delay.

Represented in FIG. 2 is a diagram of the degree of membership $Z_\delta$ of a digital value $\delta$ of the smoothed ignition delay difference relative to a fuzzy set of possible values thereof. The degree of membership $Z_\delta$ is expressed by means of values between 0 and 1.

The digital values $\delta$ vary in the design specified here as an example between $-128$ and $+127$, corresponding to an 8-bit representation of these values. This range of values between $-128$ and $+127$ is subdivided into 6 approximately equal sub-ranges, the corresponding limiting values being $-128$, $-86$, $-43$, $0$, $+43$, $+86$, $+127$.

The degree of membership $Z_\delta$ of $\delta$ to the sub-range NB drops linearly from $Z_\delta=1$ at $\delta=-128$ to $Z_\delta=0$ at $\delta=-86$. The degree of membership of $\delta$ to the sub-range NM rises linearly from $Z_\delta=0$ at $\delta=-128$ to $Z_\delta=1$ at $\delta=-86$, and then drops back linearly to $Z_\delta=0$ at $\delta=-43$. The degree of membership of $\delta$ to the sub-range NS rises linearly from $Z_\delta=0$ at $\delta=-86$ to $Z_\delta=1$ at $\delta=-43$, and then drops back linearly to $Z_\delta=0$ at $\delta=0$. The degree of membership of $\delta$ to the sub-range ZO rises linearly from $Z_\delta=0$ at $\delta=-43$ to $Z_\delta=1$ at $\delta=-0$, and then drops back linearly to $Z_\delta=0$ at $\delta=+43$. The degree of membership of $\delta$ to the sub-range PS rises linearly from $Z_\delta=0$ at $\delta=0$ to $Z_\delta=1$ at $\delta=+43$, and then drops back linearly to $Z_\delta=0$ at $\delta=+86$. The degree of membership of $\delta$ to the sub-range PM rises linearly from $Z_\delta=0$ at $\delta=+43$ to $Z_\delta=1$ at $\delta=+86$, and then drops back linearly to $Z_\delta=0$ at $\delta=+127$. The degree of membership of $\delta$ to the sub-range PB rises linearly from $Z_\delta=0$ at $\delta=+86$ to $Z_\delta=1$ at $\delta=+127$.

Figure 3:
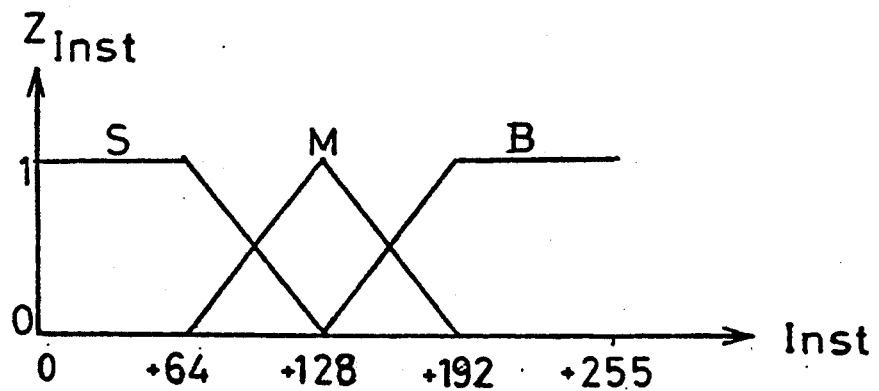
FIG. 3 shows a diagram of the degree of membership of a value of the instability relative to a fuzzy set of possible values of the instability.

Represented in FIG. 3 is a diagram of the degree of membership $Z_{Inst}$ of a digital value "Inst" corresponding to the instability in the spark erosion process relative to a fuzzy set of possible values thereof. The degree of membership $Z_{Inst}$ is expressed by means of values between 0 and 1.

The digital values "Inst" vary in the design specified here as an example between 0 and $+255$, corresponding to an 8-bit representation of these Values. This range of values between 0 and $+255$ is subdivided into 4 approximately equal sub-ranges, the corresponding limiting values being 0, $+64$, $+128$, $+192$, $+255$.

The degree of membership of "Inst" relative to the sub-range S remains constant at $Z_{Inst}=1$ between Inst$=-0$ and Inst$=+64$, and then drops linearly to $Z_{Inst}=0$ at Inst$=+128$. The degree of membership of Inst relative to the sub-range M rises linearly from $Z_{Inst}=0$ at Inst$=+64$ to $Z_{Inst}=1$ at Inst$=+128$, and then drops linearly to $Z_{Inst}=0$ at Inst$=+192$. The degree of membership of Inst relative to the sub-range B rises linearly from $Z_{Inst}=0$ at Inst$=+128$ to $Z_{Inst}=1$ at Inst$=+192$, and then remains constant at $Z_{Inst}=1$ between Inst$=+192$ and Inst$=+255$.

Figure 4:
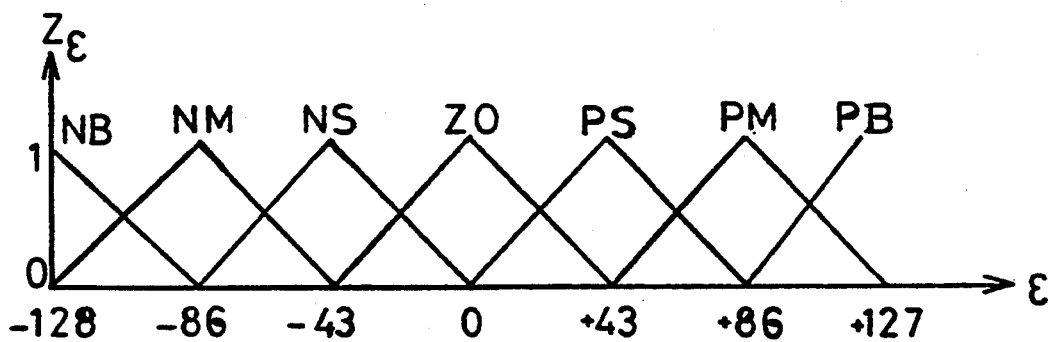
FIG. 4 shows a diagram of the degree of membership of a value of the output signal of a logic device relative to a fuzzy set of possible values of this output signal, with fixed thresholds.

Represented in FIG. 4 is a diagram of the degree of membership $Z_\epsilon$ of a digital value $\epsilon$ of the output signal of the logic device 5 relative to a fuzzy set of possible values thereof. The degree of membership $Z_\epsilon$ is expressed by means of values between 0 and 1.

The digital values $\epsilon$ vary in the design specified here as an example between $-128$ and $+127$, corresponding to an 8-bit representation of these values. This range of values between $-128$ and $+127$ is subdivided into 6 approximately equal sub-ranges, the corresponding limiting values being $-128$, $-86$, $-43$, $0$, $+43$, $+86$, $+127$.

The degree of membership $Z_{6\delta}$ of $\epsilon$ to the sub-range NB drops linearly from $Z_\epsilon=1$ at $\epsilon=-128$ to $Z_\epsilon=0$ at $\epsilon=-86$. The degree of membership of $\epsilon$ relative to the sub-range NM rises linearly from $Z_\epsilon=0$ at $\epsilon=-128$ to $Z_\epsilon=1$ at $\epsilon=-86$, and then drops back linearly to $Z_\epsilon=0$ at $\epsilon=-43$. The degree of membership of $\epsilon$ relative to the sub-range NS rises linearly from $Z_\epsilon=0$ at $\epsilon=-86$ to $Z_\epsilon=1$ at $\epsilon=-43$, and then drops back linearly to $Z_\epsilon=0$ at $\epsilon=0$. The degree of membership of $\epsilon$ relative to the sub-range ZO rises linearly from $Z_\epsilon=0$ at $\epsilon=-43$ to $Z_\epsilon=1$ at $\epsilon=0$, and then drops back linearly to $Z_\epsilon=0$ at $\epsilon=+43$. The degree of membership of $\epsilon$ relative to the sub-range PS rises linearly from $Z_\epsilon=0$ at $\epsilon=0$ to $Z_\epsilon=1$ at $\epsilon=+43$, and drops back linearly to $Z_\epsilon=0$ at $\epsilon=+86$. The degree of membership of $\epsilon$ relative to the sub-range PM rises linearly from $Z_\epsilon=0$ at $\epsilon=+43$ to $Z_\epsilon=1$ at $\epsilon=+86$, and drops back linearly to $Z_\epsilon=0$ at $\epsilon=+127$. The degree of membership of $\epsilon$ relative to the sub-range PB rises linearly from $Z_\epsilon=0$ at $\epsilon=+86$ to $Z_\epsilon=1$ at $\epsilon=+127$.

The parameters named above are processed depending on their membership or their degree of membership relative to the sub-ranges defined above according to the following rules:

| If δ in NS | then | ε in NS | | |
|---|---|---|---|---|
| If δ in ZO | then | ε in ZO | | |
| If δ in PS | then | ε in PS | | |
| If δ in NM | and | Inst in B | then | ε in NS |
| If δ in NM | and | Inst in M | then | ε in NM |
| If δ in NM | and | Inst in S | then | ε in NM |
| If δ in NB | and | Inst in B | then | ε in NM |
| If δ in NB | and | Inst in M | then | ε in NB |
| If δ in NB | and | Inst in S | then | ε in NB |
| If δ in PM | and | Inst in B | then | ε in PS |
| If δ in PM | and | Inst in M | then | ε in PS |
| If δ in PM | and | Inst in S | then | ε in PM |
| If δ in PB | and | Inst in B | then | ε in PS |
| If δ in PB | and | Inst in M | then | ε in PM |
| If δ in PB | and | Inst in S | then | ε in PB |

In the procedure according to the above-mentioned EP-A-0333170 or U.S. Pat. No. 4,864,091, an error signal which is fed to the controller of the movement of the spark erosion electrode is formed in a computer from a difference between an actual value and a desired value of a selected parameter which is used to control the movement of the spark erosion electrode. The above-mentioned difference is the input signal of the computer and the error signal is the output signal of the computer. The ratio of the input signal of the computer to its output signal is varied in the computer as a function of another selected parameter. In the procedure according to EP-A-0333170 or U.S. Pat. No. 4,864,091, the first mentioned selected parameter is the difference between an actual value and a desired value of the position of the spark erosion electrode with reference to the workpiece, whereas the second selected parameter mentioned is the ignition delay. According to EP-A-0333170 or U.S. Pat. No. 4,864,091, the computer varies the ratio of its input signal to its output signal according to the functions retained in a fixed-value table. As mentioned at the beginning, such a procedure cannot do justice to the complexity of the spark erosion process. For example, it is not sufficient to calculate the instability on the basis of the time derivative of the output signal of the logic device 5, because the mechanical time constants cause a damping effect.

In the method according to the invention, in addition to signal processing known per se, for example according to EP-A-0333170 or U.S. Pat. No. 4864091, the logic device 5 varies the output signal ε of the logic device 5 with the aid of the rules stored in the logic device 5 according to the laws of fuzzy logic. For this purpose, the sets relevant to the output signal ε are combined and evaluated in a manner known per se in relation to their degree of membership.

For example, the relevant sets are reduced after the procedure of so-called max-min inference in accordance with their degree of membership and then superposed, thus producing a resulting surface as a function of the output signal ε in the diagram of the degree of membership, whereupon the center of gravity of this surface is determined and the abscissa of this center of gravity is used as the value of the resulting output signal ε.

In order to simplify the following explanation, it is assumed that the above-mentioned signal processing, which is known per se, consists in simply transferring the input signal δ of the logic device 5 to the output thereof. In other words, without signal processing in the logic device 5 with the aid of the rules stored therein according to the laws of fuzzy logic, the output signal ε of the logic device 5 would be equal to its input signal δ.

In the method according to the invention, the output signal ε of the logic device 5 is equal to its input signal δ only if δ is small. If δ is positive and the instability is large, the output signal ε of the logic device 5 becomes smaller than its input signal δ in order to reduce the sensitivity of the control system.

If δ is negative and the instability is large, the output signal ε of the logic device 5 also become smaller than its input signal δ, but to a lesser extent than in the case when δ is positive. If, specifically, a short-circuit at the working clearance, or some other degeneration of the spark erosion process is produced, the working clearance is quick to be enlarged, which is why safety takes priority here over the stability of the spark erosion process.

Figure 5:
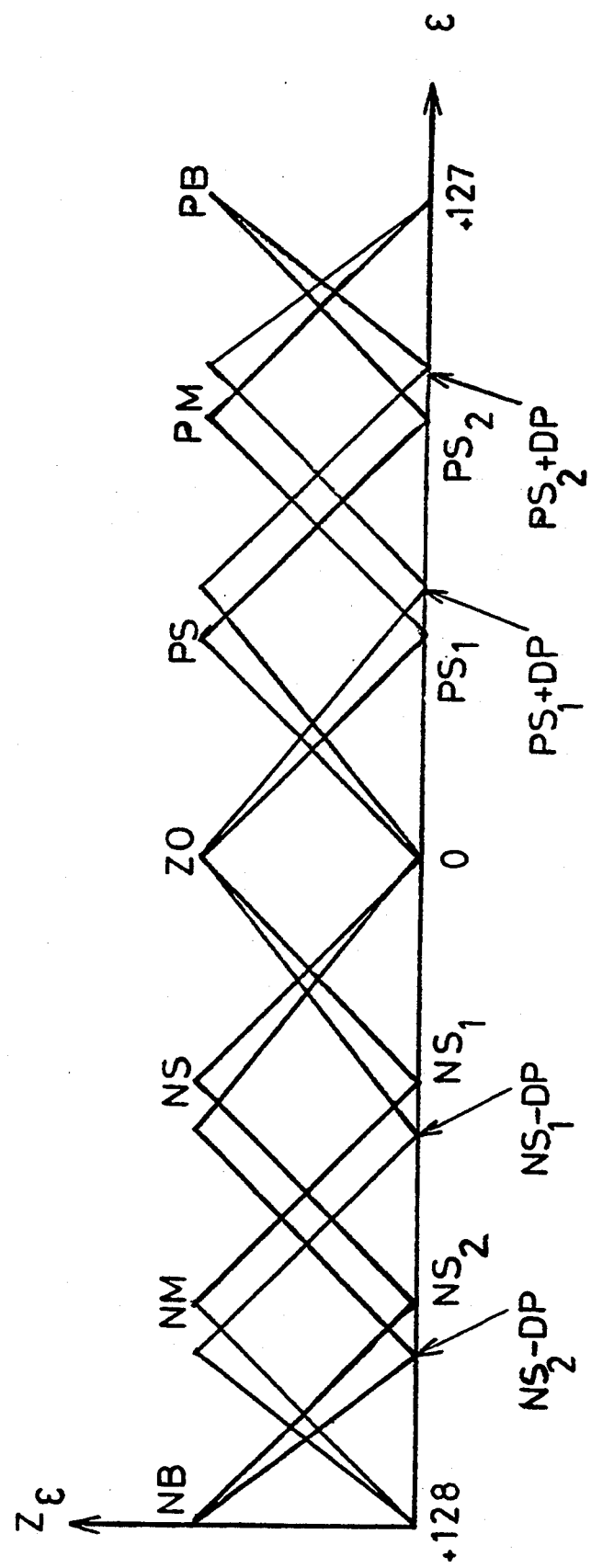
FIG. 5 shows a diagram of the degree of membership of a value of the output signal of a logic device relative to a fuzzy set of possible values of this output signal, with optimizable thresholds.

A development of the method described in conjunction with FIG. 4 and of the corresponding device is now described in conjunction with FIG. 5.

As in FIG. 4, represented in FIG. 5 is a diagram of the degree of membership $Z_\epsilon$ of a digital value ε of the output signal of the logic device 5 relative to a fuzzy set of possible values thereof. The degree of membership $Z_\epsilon$ is expressed by means of values between 0 and 1.

The digital values ε vary in the design specified here as an example between −128 and +127, corresponding to an 8-bit representation of these values. This range of values between −128 and +127 is subdivided into 6 sub-ranges which, differing from the design according to FIG. 4, can be varied with the aim of optimizing the method according to the invention. The corresponding limiting values are −128, $NS_2$, $NS_1$, 0, $PS_1$, $PS_2$, +127.

In the initial state, these limiting values are the same as in the design according to FIG. 4, that is to say it then holds that

| $NS_2 = -86$ | $PS_1 = +43$ |
|---|---|
| $NS_1 = -43$ | $PS_2 = +86$ |

The degree of membership $Z_\epsilon$ of ε relative to the sub-range NB drops linearly from $Z_\epsilon=1$ at $\epsilon=-128$ to $Z_\epsilon=0$ at $\epsilon=NS_2$. The degree of membership of ε relative to the sub-range NM rises linearly from $Z_\epsilon=0$ at $\epsilon=-128$ to $Z_\epsilon=1$ at $\epsilon=NS_2$, and then drops back linearly to $Z_\epsilon=0$ at $\epsilon=NS_1$. The degree of membership of ε relative to the sub-range NS rises linearly from $Z_\epsilon=0$ at $\epsilon=NS_2$ to $Z_\epsilon=1$ at $\epsilon=NS_1$, and then drops back linearly to $Z_\epsilon=0$ at $\epsilon=0$. The degree of membership of ε relative to the sub-range ZO rises linearly from $Z_\epsilon=0$ at $\epsilon=NS_1$ to $Z_\epsilon=1$ at $\epsilon=0$, and then drops back linearly to $Z_\epsilon=0$ at $\epsilon=PS_1$. The degree of membership of ε relative to the sub-range PS rises linearly from $Z_\epsilon=0$ at $\epsilon=0$ to $Z_\epsilon=1$ at $\epsilon=PS_1$ and then drops back linearly to $Z_\epsilon=0$ at $\epsilon=PS_2$. The degree of membership of ε relative to the sub-range PM rises linearly from $Z_\epsilon=0$ at $\epsilon=PS_1$ to $Z_\epsilon=1$ at $\epsilon=PS_2$, and then drops back linearly to $Z_\epsilon=0$ at $\epsilon=+127$. The degree of membership of ε relative to the sub-range PB rises linearly from $Z_\epsilon=0$ at $\epsilon=PS_2$ to $Z_\epsilon=1$ at $\epsilon=+127$.

According to their membership or the degree of membership relative to the previously defined sub-ranges, the above-mentioned parameters are processed according to the same rules as mentioned above.

In order to optimize the method according to the invention, the limiting values $NS_2$, $NS_1$, $PS_1$, $PS_2$ are varied in pairs by a predetermined amount DP in each case, whereupon after a waiting time the feed rate (rate of variation in the position of the spark erosion electrode with reference to the workpiece) is determined. That combination of limiting values is then selected which has produced the highest feed rate. This optimization is repeated, always starting from the last selected combination of limiting values, in order to target and retain the highest possible feed rate. The above-mentioned waiting time is, for example, the period after which an essentially constant new value of the feed rate has been adjusted: this period can be determined empirically and is generally of the order of magnitude of a minute, although it can vary with the pulse duration T, the interpulse duration P and the current amplitude I.

The previously described optimization of the method according to the invention can be carried out manually, or also automatically, for example controlled by a computer.

The limiting values $NS_2$, $NS_1$, $PS_1$, $PS_2$ are varied, for example, in pairs by the digital value $\pm 3$ or $\pm 6$, which according to the following table in each case produces an operating point $P_0$, $P_1$, $P_2$, $P_3$, $P_4$, and a corresponding erosion of the workpiece, this erosion being estimated from the established feed rate:

| $NS_2$ | $NS_1$ | $PS_1$ | $PS_2$ | Operating point | Erosion ($mm^3$/min) |
|---|---|---|---|---|---|
| −86 | −43 | +43 | +86 | $P_0$ | 15 |
| −86 | −43 | +46 | +89 | $P_1$ | 22 |
| −86 | −43 | +40 | +83 | $P_2$ | 12 |
| −83 | −40 | +43 | +86 | $P_3$ | 18 |
| −89 | −46 | +43 | +86 | $P_4$ | 18 |

The optimum operating point of this series of search operations is at $P_1$ with an erosion of 22 $mm^3$/min. The corresponding combination of limiting values $NS_2 = -86$, $NS_1 = -43$, $PS_1 = +46$, $PS_2 = +89$ is selected as a new combination and used until, starting therefrom, the optimization operation is repeated.

It is expedient in this case to limit the range of variation in the limiting values $NS_2$, $NS_1$, $PS_1$, $PS_2$ to the range between a minimum value and a maximum value. For example, the range of variation in the limiting values $NS_2$, $NS_1$, $PS_1$, $PS_2$ is limited to the range of $\pm 21$ about the respective limiting values in the initial state when the latter are equal to $NS_2 = -86$, $NS_1 = -43$, $PS_1 = +43$, $PS_2 = +86$, so that the relevant ranges abut one another without overlapping.

It is advantageous in the method according to the invention that is preferred and here described that the control system reacts to actual movements of the spark erosion electrode, so that it can be well judged which movements are really executed and which component of these movements is damped by the mechanical transmission, as is the case, in particular, in large spark erosion machines.

It is to be understood that with the exception of the logic device 5 all the circuits shown in FIG. 1 can be included in a single computer or computing element and implemented therein.

I claim:

1. In a spark erosion machine having a spark erosion electrode and a workpiece, a method for controlling an inter-electrode distance between said spark erosion electrode and said workpiece across a machining gap during a feed control operation independent of a jump control operation in a spark erosion process in the spark erosion machine having the spark erosion electrode (F) and the workpiece (W), the method comprising the steps of: providing a logic device; feeding at least two parameters ($\delta$, Inst) whose variation is known to influence a currently prevailing state of the spark erosion process to the logic device (5) in order to generate at least one output signal ($\epsilon$) of the logic device; controlling at least one of the parameters ($\delta$) with a controller based upon the output signal of the logic device with the aid of rules stored in the logic device, according to the laws of fuzzy logic, said at least two parameters ($\delta$, Inst) corresponding essentially to one common currently prevailing state of the spark erosion process, the rules stored in the logic device (5) determining how one of the fed parameters ($\delta$) is to be varied when another (Inst) of the fed parameters varies, and the controller (6) varying the parameter ($\delta$) to be varied in such a way that the currently prevailing state of the spark erosion process is at least approximated to a currently desired state of the spark erosion process to perform the feed control operation.

2. A method according to claim 1, wherein the feeding step includes feeding the logic device (5) at least a first parameter ($\delta$) which corresponds to a difference between an actual value ($t_{df}$) and a desired value ($t_{ds}$) of an ignition delay of a spark ignition in a region of a spark gap (9) of the spark erosion machine.

3. A method according to claim 2, wherein the feeding step includes feeding the logic device (5) a first parameter ($\delta$) which corresponds to a difference, smoothed in a low-pass filter circuit (2), between the actual value ($t_{df}$) and the desired value ($t_{ds}$) of the ignition delay of the spark ignition in the region of the spark gap (9) of the spark erosion machine.

4. A method according to claim 2, wherein the feeding step includes feeding the logic device (5) at least a second parameter which corresponds to the instability (Inst) in the spark erosion process.

5. A method according to claim 4, wherein the feeding step includes feeding a second parameter that corresponds to one of a short-term range of variation and a short-term rate of variation in a position of the spark erosion electrode (F) with reference to the workpiece (W).

6. A method according to claim 4, wherein the feeding step includes feeding a second parameter that corresponds to one of a short-term range of variation and a short-term rate of variation in the ignition delay.

7. A method according to claim 4, wherein the feeding step includes feeding a second parameter that corresponds to one of a short-term range of variation and a short-term rate of variation in the output signal of the logic device.

8. A method according to claim 4, wherein the feeding step includes feeding a second parameter that corresponds to a combination of a short-term range of variation and a short-term rate of variation in a position of the spark erosion electrode (F) with reference to the workpiece (W).

9. A method according to claim 4, wherein the feeding step includes feeding a second parameter that corresponds to a combination of a short-term range of variation and a short-term rate of variation in the ignition delay.

10. A method according to claim 4, wherein the feeding step includes feeding a second parameter that corresponds to a combination of a short-term range of variation and a short-term rate of variation in the output signal of the logic device.

11. A method according to claim 2, including processing the first and second parameters (δ, Inst) in the logic device with the aid of the following rules:

| If δ in NS | then | ε in NS | | |
|---|---|---|---|---|
| If δ in ZO | then | ε in ZO | | |
| If δ in PS | then | ε in PS | | |
| If δ in NM | and | Inst in B | then | ε in NS |
| If δ in NM | and | Inst in M | then | ε in NM |
| If δ in NM | and | Inst in S | then | ε in NM |
| If δ in NB | and | Inst in B | then | ε in NM |
| If δ in NB | and | Inst in M | then | ε in NB |
| If δ in NB | and | Inst in S | then | ε in NB |
| If δ in PM | and | Inst in B | then | ε in PS |
| If δ in PM | and | Inst in M | then | ε in PS |
| If δ in PM | and | Inst in S | then | ε in PM |
| If δ in PB | and | Inst in B | then | ε in PS |
| If δ in PB | and | Inst in M | then | ε in PM |
| If δ in PB | and | Inst in S | then | ε in PB | according to the laws of fuzzy logic, for generating the output signal (ε) of the logic device (5), δ denoting the first parameter, Inst denoting the second parameter, and ε denoting the output signal of the logic device, the following definitions being used for ranges of the values of the parameters δ and Inst and of the output signal ε:

| NB | negative big | B | big |
|---|---|---|---|
| NM | negative medium | M | medium |
| NS | negative small | S | small |
| ZO | approximately zero | | |
| PB | positive big | | |
| PM | positive medium | | |
| PS | positive small. | | |

12. A method according to claim 11, including situating at least two adjacent ranges of values of the output signal (ε) between respective limiting values (−128, NS$_2$, NS$_1$; 0, PS$_1$, PS$_2$, +127), and varying two adjacent of the limiting values (NS$_2$, NS$_1$; PS$_1$, PS$_2$) in pairs for optimizing the method.

13. A method according to claim 12, including varying the limiting values (NS$_2$, NS$_1$; PS$_1$, PS$_2$) in pairs by a predetermined amount (DP) in each case, determining a corresponding rate of variation in the position of the spark erosion electrode (F) with reference to the workpiece (W) after stabilizing a resulting new state of the spark erosion process, carrying out the variation of the limiting values a plurality of times, intercomparing resulting rates of variation, and continuing an optimized method using those optimized limiting values by means of which a largest resulting rate of variation was achieved.

14. A method according to claim 13, including recursively repeating the method using the optimized limiting values last determined in each case.

15. A method according to claim 1, wherein the feeding step includes feeding the parameters in combination.

16. A method according to claim 1, wherein the feeding step includes feeding the parameters individually.

17. A method according to claim 1, wherein the parameter controlled by the output signal (ε) of the logic device (5) corresponds to a position of the spark erosion electrode (F) with reference to the workpiece (W) in the spark erosion machine.

18. A method according to claim 17, including processing the first and second parameters (δ, Inst) in the logic device with the aid of the following rules:

| If δ in NS | then | ε in NS | | |
|---|---|---|---|---|
| If δ in ZO | then | ε in ZO | | |
| If δ in PS | then | ε in PS | | |
| If δ in NM | and | Inst in B | then | ε in NS |
| If δ in NM | and | Inst in M | then | ε in NM |
| If δ in NM | and | Inst in S | then | ε in NM |
| If δ in NB | and | Inst in B | then | ε in NM |
| If δ in NB | and | Inst in M | then | ε in NB |
| If δ in NB | and | Inst in S | then | ε in NB |
| If δ in PM | and | Inst in B | then | ε in PS |
| If δ in PM | and | Inst in M | then | ε in PS |
| If δ in PM | and | Inst in S | then | ε in PM |
| If δ in PB | and | Inst in B | then | ε in PS |
| If δ in PB | and | Inst in M | then | ε in PM |
| If δ in PB | and | Inst in S | then | ε in PB | according to the laws of fuzzy logic, for generating the output signal (ε) of the logic device (5), δ denoting the first parameter, Inst denoting the second parameter, and ε denoting the output signal of the logic device, the following definitions being used for ranges of the values of the parameters δ and Inst and of the output signal ε:

| NB | negative big | B | big |
|---|---|---|---|
| NM | negative medium | M | medium |
| NS | negative small | S | small |
| ZO | approximately zero | | |
| PB | positive big | | |
| PM | positive medium | | |
| PS | positive small. | | |

19. A method according to claim 18, including situating at least two adjacent ranges of values of the output signal (ε) between respective limiting values (−128, NS$_2$, NS$_1$; 0, PS$_1$, PS$_2$, +127), and varying two adjacent of the limiting values (NS$_2$, NS$_1$; PS$_1$, PS$_2$) in pairs for optimizing the method.

20. A method according to claim 19, including varying the limiting values (NS$_2$, NS$_1$; PS$_1$, PS$_2$) in pairs by a predetermined amount (DP) in each case, determining a corresponding rate of variation in the position of the spark erosion electrode (F) with reference to the workpiece (W) after stabilizing a resulting new state of the spark erosion process, carrying out the variation of the limiting values a plurality of times, intercomparing resulting rates of variation and continuing an optimized method using those optimized limiting values by means of which a largest resulting rate of variation was achieved.

21. A method according to claim 20, including recursively repeating the method using the optimized limiting values last determined in each case.

22. In a spark erosion machine having a spark erosion electrode and a workpiece, a device for controlling an inter-electrode distance between said spark erosion electrode and said workpiece across a machining gap during a feed control operation independent of a jump control operation in a spark erosion process in the spark erosion machine, comprising: the spark erosion electrode (F); the workpiece (W); logic means (5) having at least two inputs for parameters (δ, Inst) to be input and at least one output for an output signal (ε); a controller (6) for controlling at least one parameter to perform the feed control operation, the logic means feeding the output signal to the controller, the logic means (5) being constructed to store a set of rules for processing the parameters fed to it according to laws of fuzzy logic.

* * * * *